(12) United States Patent
Skaare et al.

(10) Patent No.: US 8,487,464 B2
(45) Date of Patent: Jul. 16, 2013

(54) BLADE PITCH CONTROL IN A WIND TURBINE INSTALLATION

(75) Inventors: Bjorn Skaare, Trondheim (NO); Finn Gunnar Nielsen, Bones (NO)

(73) Assignee: Hywind AS, Stavanger (NO)

( * ) Notice: Subject to any disclaimer, the term of this patent is extended or adjusted under 35 U.S.C. 154(b) by 87 days.

(21) Appl. No.: 13/131,620

(22) PCT Filed: Dec. 23, 2009

(86) PCT No.: PCT/GB2009/002959
§ 371 (c)(1),
(2), (4) Date: Sep. 13, 2011

(87) PCT Pub. No.: WO2010/076557
PCT Pub. Date: Jul. 8, 2010

(65) Prior Publication Data
US 2011/0316277 A1    Dec. 29, 2011

(30) Foreign Application Priority Data
Dec. 30, 2008  (GB) .................................. 0823683.8

(51) Int. Cl.
*H02P 9/04*    (2006.01)

(52) U.S. Cl.
USPC .......................................................... 290/44

(58) Field of Classification Search
None
See application file for complete search history.

(56) References Cited

U.S. PATENT DOCUMENTS

| | | | |
|---|---|---|---|
| 4,168,439 A | * | 9/1979 | Palma .............................. 290/44 |
| 4,420,692 A | * | 12/1983 | Kos et al. ......................... 290/44 |
| 4,435,647 A | | 3/1984 | Harner et al. |
| 7,734,400 B2 | * | 6/2010 | Gayme et al. ................... 701/54 |
| 8,186,949 B2 | * | 5/2012 | Nielsen et al. ..................... 416/9 |

(Continued)

FOREIGN PATENT DOCUMENTS

| CL | 3344-08 | 11/2008 |
|---|---|---|
| EP | 1719910 | 11/2006 |

(Continued)

OTHER PUBLICATIONS

T.G. Van Engelen, et al., Title: "Development of Wind Turbine Control Algorithms for Industrial Use", Jul. 2011, Paragraph h 1, 2 and 3.2, Fig. 1: European Wind Energy Conference, Copenhagen Denmark.

(Continued)

*Primary Examiner* — Nicholas Ponomarenko
*Assistant Examiner* — Sean Gugger
(74) *Attorney, Agent, or Firm* — Sutherland Asbill & Brennan LLP

(57) ABSTRACT

The present invention relates to a blade pitch controller for a floating wind turbine structure, wherein the floating wind turbine structure may include a support structure supporting a rotor having a number of blades. The controller may include standard blade pitch control means and active damping means. The standard blade pitch control means is arranged to control a blade pitch using a transfer function between a rotor speed error and the blade pitch. The active damping means is arranged to further control the blade pitch on the basis of a speed of a point on the wind turbine structure by converting the speed of a point on the wind turbine structure into a rotor speed error and using the same transfer function that is used in the standard blade pitch control means to convert the rotor speed error into a correction to the blade pitch.

27 Claims, 10 Drawing Sheets

U.S. PATENT DOCUMENTS

| | | | |
|---|---|---|---|
| 2008/0206051 A1* | 8/2008 | Wakasa et al. ................ | 416/41 |
| 2008/0260514 A1 | 10/2008 | Nielsen et al. | |
| 2009/0250932 A1 | 10/2009 | Egedal | |
| 2010/0187820 A1 | 7/2010 | Wakasa et al. | |

FOREIGN PATENT DOCUMENTS

| | | |
|---|---|---|
| EP | 1956236 | 8/2008 |
| EP | 2 107 236 A1 | 10/2009 |
| GB | 2117933 | 10/1983 |
| WO | 2005/083266 | 9/2005 |
| WO | 2007/053031 A1 | 5/2007 |
| WO | 2008/081232 | 7/2008 |
| WO | 2009/035363 | 3/2009 |

OTHER PUBLICATIONS

E.L. Van Der Hooft, et al., Title: "Design Tool for Wind Turbine Control Algorithms", Nov. 2004, Fig. 2: ECN Wind Energy, Netherlands.

Yoshinori Ueda, et al., Title: "Developmnet of Next Generation 2MW Class Large Wind Turbines", Oct. 2004, Technical Review, vol. 41, No. 5, Paragraph 3.(4), Fig. 7: Mitsubishi Heavy Industries, Ltd.

E.L. Van Der Hooft, et al., Title: "Wind Turbine Control Algorithms", ECN-C—03-11, Dec. 2003, Paragraph 5.2.

Technical Sales Document, Appendix 4: "Vestas V82 and V90 Wind Turbine Specifications, and the Vestas V100 Wind Turbine Product Brochure", 2004, Paragraph 1.3.2.1: TSD 4000258-01 EN, pp. 1-38.

* cited by examiner

| TOWER TOP MOTION | | |
|---|---|---|
| | Mean Value [m] | Standard Deviation [m] |
| Conventional Controller | 9.12 | 3.03 |
| Active Damping Controller for Fixed Foundation Turbines | 9.13 | 3.12 |
| Active Damping Controller for Floating Turbines | 9.19 | 2.12 |
| Waves Only | -0.09 | 1.48 |

| TOWER BENDING MOMENTS | | |
|---|---|---|
| | Mean Value [kNm] | Standard Deviation [kNm] |
| Conventional Controller | 10383 | 6611 |
| Active Damping Controller for Fixed Foundation Turbines | 10389 | 6661 |
| Active Damping Controller for Floating Turbines | 10508 | 5697 |
| Waves Only | -1050 | 4937 |

Fig. 10

| ROTOR THRUST FORCE | | |
|---|---|---|
| | Mean Value [kN] | Standard Deviation [kN] |
| Conventional Controller | 187 | 42 |
| Active Damping Controller for Fixed Foundation Turbines | 187 | 42 |
| Active Damping Controller for Floating Turbines | 188 | 54 |

| | ROTOR SPEED | |
|---|---|---|
| | Mean Value [rad/s] | Standard Deviation [rad/s] |
| Conventional Controller | 1.79 | 0.03 |
| Active Damping Controller for Fixed Foundation Turbines | 1.79 | 0.03 |
| Active Damping Controller for Floating Turbines | 1.79 | 0.06 |

| POWER PRODUCTION | | |
|---|---|---|
| | Mean Value [MW] | Standard Deviation [MW] |
| Conventional Controller | 2295 | 35 |
| Active Damping Controller for Fixed Foundation Turbines | 2295 | 34 |
| Active Damping Controller for Floating Turbines | 2291 | 52 |

BLADE PITCH CONTROL IN A WIND TURBINE INSTALLATION

TECHNICAL FIELD

The present invention relates to the field of rotor blade pitch control for wind turbine installations. More specifically, it relates to rotor blade pitch control for floating wind turbine installations.

BACKGROUND OF THE INVENTION

A wind turbine installation is usually formed of a support structure comprising an elongate tower, with a nacelle and a rotor attached to the upper end of the support structure. The generator and its associated electronics are usually located in the nacelle.

Fixed-base wind turbines that are fixed either to the land or the sea bed are well-established.

However, recently there has been a desire to develop floating wind turbines and various structures have been proposed. One example is a wind turbine installation where a conventional wind turbine structure is mounted on a buoyant base such as a platform or raft-like structure. Another proposal is a "spar buoy" type structure. Such a structure is formed of an elongate buoyant support structure with a rotor mounted on the top. The support structure could be a unitary structure or it could be an elongate sub-structure with a standard tower mounted thereon.

Floating wind turbine installations may be tethered to the sea bed via one or more mooring lines with anchors, or attached to the sea bed with one or more articulated (hinged) legs, for example, in order to hold them at their desired installation sites.

In conventional wind turbines, the pitch of the rotor blades is controlled on the basis of the rotor speed in order to regulate the power output. When operating in winds below a certain wind speed (which is referred to as the rated wind speed of a wind turbine), the blade pitch is kept approximately constant at an angle that provides maximum power output. In contrast, when operating above the rated wind speed, the blade pitch is adjusted in order to produce a constant power output and prevent excessively high power outputs that could damage the generator and/or its associated electronics. This constant power is referred to as the rated power of the wind turbine.

When operating below the rated wind speed, as the blade pitch is kept approximately constant, the thrust acting on the rotor increases with the wind speed (thrust being approximately proportional to the square of the wind speed).

In contrast, when operating above the rated wind speed the blade pitch is adjusted such that the thrust on the rotor decreases with increasing wind speed in order to produce a constant power output. As the wind speed increases, the blade pitch is increased, i.e. made more parallel to the wind direction, in order to reduce the thrust.

In practice, wind turbines operate in conditions both above and below their rated wind speed.

In order to produce maximum power output when operating below the rated wind speed, the blade pitch is set in order to produce an optimum tip speed ratio. The tip speed ratio, $\lambda$, is defined as the speed at which the outer tips of the rotor blades are moving divided by the wind speed and is given by:

$$\lambda = \frac{\omega R}{u} \quad (1)$$

where $\omega$ is the angular frequency of the rotor (in radians per second), R is the radius of the rotor and u is the wind speed. An optimum tip speed ratio for maximum power output is around 8 to 10 and in most wind turbines this will in practice give a power coefficient $C_p$ of around 0.45 (0.59 being the theoretical maximum), where the power P is defined as:

$$P = \frac{1}{2}\rho A C_p(\lambda, \beta) u^3 \quad (2)$$

where $\rho$ is the air density, A is the area swept by the rotor blades and $C_p$ is the power coefficient which is determined by $\lambda$ and the blade pitch $\beta$.

As mentioned above, in order to produce a constant power output when operating above the rated wind speed, the blade pitch is adjusted in order to produce a constant rotor speed and thereby a constant power output. A problem associated with adjusting the blade pitch in this way is that it can cause negative damping, i.e. as the relative velocity between the turbine and the wind increases, the thrust force reduces. This can increase the amplitude of the wind turbine's oscillations or vibrations. Negative damping causes a reduction in the overall efficiency or power output of the wind turbine and, moreover, can create excessive motions that cause structural stresses which can damage or weaken the wind turbine structure and could cause instability in floating wind turbines. Negative damping can be a particular problem for high power (e.g. >2 MW) turbines.

Negative damping in fixed-base wind turbines arises because the turbine may vibrate forwards and backwards due to excitations of the tower's natural bending vibrations. As the wind turbine moves towards the wind, the relative wind speed acting on the wind turbine increases, which tends to increase the rotor torque or speed. Using the pitch control described above for constant power output, in response to an increase in the rotor torque or speed, the blade pitch angle is adjusted to reduce the torque acting on the rotor and, as a result, reduce the thrust and thereby maintain constant power. However, as the thrust is reduced, the damping force acting on the wind turbine's vibrations is also reduced and can become negative. In other words, the vibrations can be exacerbated and their amplitude increases. This then results in a further change in the relative wind speed and a further adjustment to the blade pitch, making the vibrations even larger. The opposite applies when the wind turbine is moving away from the wind, resulting in a further exacerbation of the vibrations.

The problem of negative damping is illustrated in FIG. 1, which shows the thrust force as a function of wind speed for a 2.3 MW turbine using the standard blade pitch control described above. The thrust force for wind speeds above 12 ms$^{-1}$ decreases with increasing wind speed, and consequently negative damping may be introduced into the system in this wind speed range.

In fixed-base wind turbines, negative damping can be prevented or minimised by reducing the bandwidth of the blade pitch controller to lie below the natural frequency of the first order bending mode of the tower. In other words, the controller does not adjust the blade pitch for tower motions with frequencies above the natural frequency of the first order bending mode of the tower.

However, a floating wind turbine also has other modes of oscillation, besides the bending modes, which makes the problem of dealing with negative damping in floating wind turbines much more complex. Moreover, the prior art system discussed above does not deal with the most significant modes of oscillation in a floating wind turbine installation.

FIG. 2 shows a typical power spectrum for the oscillations of a typical floating wind turbine installation of the type having an elongate "spar buoy" type design. The scale on the vertical axis is proportional to the amplitude of the oscillations, which is proportional to the square root of the power of the oscillations. The scale on the horizontal axis is the frequency of the oscillations in Hz. The first line in the legend represents the oscillations present when standard pitch control (i.e. on the basis of the rotor speed) is used. The second line represents the oscillations present when vibration control for active damping of the support structure's bending mode vibrations is used (this is described below). The third line represents the oscillations present when pitch control according to the present invention is used (this will be discussed later).

The power spectrum has four main peaks. Only the fourth peak is also present in the power spectrum for a fixed-base wind turbine. The first three peaks are seen only in floating wind turbines.

The first peak occurs at frequencies of around 0.008 Hz and corresponds to the rigid body oscillations of the support structure$_{[fG1]}$ that are caused by the surge motion of the floating wind turbine coupled with the restoring effects of the mooring lines. In these oscillations the tower moves forwards and backwards horizontally but remains in an essentially vertical position. The size of this peak (i.e. the size of or energy in these oscillations) is not much affected by different approaches to pitch control. Generally the magnitude of these oscillations is not critical as the oscillations are very slow. Therefore, these oscillations do not suffer too much from negative damping. Furthermore, these oscillations do not result in large structural stresses on the tower. Consequently, these motions are accepted by designers and it is not necessary to try to prevent or minimise the negative damping of tower movements at these frequencies.

The second peak occurs at frequencies of about 0.03 to 0.04 Hz and corresponds to the rigid body pitch oscillations of the support structure (i.e. the "nodding" back and forth of the support structure). When blade pitch is controlled in order to produce a constant power output, the size of this peak (i.e. the size of or energy in these oscillations) increases dramatically due to the negative damping effect previously described, resulting in large structural stresses on the tower as well as oscillations in the power output. It is therefore desirable to prevent or minimise the negative damping of these oscillations.

The third, quite broad, peak occurs at frequencies of about 0.05 to 0.15 Hz. This corresponds to the rigid body wave-induced motion (surge coupled with pitch, but mostly pitch) of the floating wind turbine. The size of this peak can be minimised by modifying the geometry and weight distribution of the floating wind turbine but generally it is not desirable to do anything in relation to the damping of tower movements at these frequencies as the oscillations are not resonant and thus not very sensitive to the damping level. Attempts to damp this motion will normally result in large turbine forces without any significant impact on the motion response.

The fourth peak occurs at frequencies of about 0.3 to 0.5 Hz. As mentioned above, these oscillations are present in both floating and fixed-base wind turbines and correspond to the structural bending vibrations of the support structure.

As mentioned above, in order to prevent or minimise the negative damping of the structural bending vibrations, the bandwidth of the blade pitch controller may be reduced such that it does not adjust the blade pitch for motions that occur at these frequencies (i.e. 0.3 to 0.5 Hz).

However, in a floating wind turbine, whilst this approach can still be applied to address bending vibrations, if the bandwidth of the blade pitch controller were reduced even further such that the controller did not adjust the blade pitch for motions that occur at frequencies above those of the rigid body oscillations of the tower in pitch (i.e. 0.03 to 0.04 Hz), this would significantly reduce the bandwidth of the controller and would result in unacceptable performance with respect to key wind turbine properties such as power production, rotor speed and rotor thrust force. Therefore, in order to avoid or reduce negative damping in a floating wind turbine installation, it is not practicable to simply reduce the bandwidth of the controller in this way.

Most modern multi-megawatt wind turbines use a proportional integral (PI) controller to control the blade pitch to produce a constant rotor speed when operating above the rated wind speed of the turbine. The PI controller is a feedback controller which controls the blade pitch and thereby the rotor speed (i.e. the rotational frequency of the rotor) on the basis of a weighted sum of the error (the difference between the output rotor speed and the desired rotor speed) and the integral of that value. When the blade pitch control system is operating above rated power, the generator torque is typically controlled to produce either a constant torque or a constant power. The following description applies to constant power control. However, a similar approach applies to a generator with constant generator torque control at rated power.

For constant power control, the generator torque, $M_{gen}$, is given as:

$$M_{gen} = \frac{P_0}{\Omega} \tag{3}$$

where $P_0$ is the rated power for the turbine and $\Omega$ is the rotor speed in radians per second.

Equation (3) can be linearised around the rated rotor speed $\Omega_0$ to give:

$$M_{gen} = \frac{P_0}{\Omega_0} - \frac{P_0}{\Omega_0^2}(\Omega - \Omega_0) \tag{4}$$

The aerodynamic torque on the wind turbine rotor, $M_{aero}$, can be linearised around the actual blade pitch angle $\theta_0$ and the rated rotor speed $\Omega_0$ to give:

$$M_{aero} = \frac{P_0}{\Omega_0} + \frac{1}{\Omega_0}\frac{\partial P}{\partial \theta}\bigg|_{\theta_0}(\theta - \theta_0) \tag{5}$$

where it is assumed that variations in the rotor speed around the rated rotor speed $\Omega_0$ are negligible compared to variations in the blade pitch angle around the actual blade pitch angle $\theta_0$.

Then from Newton's second law, the equation of motion for the rotor is given as:

$$I\dot{\Omega} = M_{aero} - M_{gen} = \frac{1}{\Omega_0}\frac{\partial P}{\partial \theta}\bigg|_{\theta_0}(\theta - \theta_0) + \frac{P_0}{\Omega_0^2}(\Omega - \Omega_0) \quad (6)$$

where I is the moment of inertia for the rotor and the generator, which is given by:

$$I = I_{rotor} + n^2 I_{gen} \quad (7)$$

where n is the gear ratio between the rotor and the generator, and θ is the blade pitch, which is given by:

$$\theta = \theta_0 + \Delta\theta \quad (8)$$

where $\theta_0$ is the current blade pitch and $\Delta\theta$ is determined by the PI controller as:

$$\Delta\theta = \theta_I + \theta_P \quad (9)$$

where:

$$\theta_I = \int K_I(\Omega - \Omega_{ref})dt = K_I \phi \quad (10)$$

$$\Omega_{ref} = \Omega_0 \quad (11)$$

and $$\theta_P = K_P(\Omega - \Omega_{ref}) = K_P \dot{\phi} \quad (12)$$

where $K_p$ is the proportional gain and $K_I$ is the integral gain of the PI controller and $\dot{\phi}$ is the rotational frequency error $(\Omega - \Omega_{ref})$.

This leads to the following equation of motion for the rotor speed for the closed loop dynamic system:

$$I\ddot{\varphi} + D\dot{\varphi} + K\varphi = 0 \quad (13)$$

where $$D = -\frac{1}{\Omega_0}\frac{\partial P}{\partial \theta}\bigg|_{\theta_0} K_P \quad (14)$$

and $$K = -\frac{1}{\Omega_0}\frac{\partial P}{\partial \theta}\bigg|_{\theta_0} K_I - \frac{P_0}{\Omega_0^2} \quad (15)$$

Here, P is the power output and $$\frac{\partial P}{\partial \theta}\bigg|_{\theta_0} < 0.$$

The dynamic system in equation (13) can be stabilised by selecting appropriate values of the control parameters $K_p$ and $K_I$.

The natural frequency $\omega_0$, relative damping $\zeta$, and damped resonance frequency $\omega_d$, of the closed loop system are then given by:

$$\omega_0 = \sqrt{\frac{K}{I}} = \sqrt{\frac{-\frac{1}{\Omega_0}\frac{\partial P}{\partial \theta}\big|_{\theta_0} K_I - \frac{P_0}{\Omega_0^2}}{I}} \quad (16)$$

$$\zeta = \frac{D}{2I\omega_0} = \frac{-\frac{1}{\Omega_0}\frac{\partial P}{\partial \theta}\big|_{\theta_0} K_P}{2I\omega_0} \quad (17)$$

and $$\omega_d = \omega_0\sqrt{1-\zeta^2} \quad (18)$$

respectively.

Generally, designers of control system for fixed foundation wind turbines try to keep the damped resonance frequency $\omega_d$ below the first order bending frequency of the tower in order to avoid resonance. Typical values are $\zeta=0.7$ and $\omega_d=0.6$ rad s$^{-1}$.

The control systems of some fixed-base wind turbines also include a vibration controller to provide active positive damping of the first order bending mode vibrations of the support structure. An example of one such system is disclosed in GB 2117933. In these systems, positive damping is provided to cancel out, at least partially, any negative damping present, resulting in close to or approximately zero net damping of these vibrations. Alternatively, the positive damping may be large enough that, as well as cancelling out any negative damping, it also provides further positive damping, resulting in a net positive damping of these vibrations.

The vibration controller provides a correction to the blade pitch on the basis of measurements of the wind turbine structure's speed in order to damp the bending vibrations. The correction to the blade pitch is provided for wind turbine motions with frequencies that corresponds to those of the first order bending mode. The wind turbine's speed can be measured with a sensor such as an accelerometer with compensation for gravitational acceleration, for example. The speed measured may be the horizontal speed of the nacelle, for example, or its pitch speed (i.e. the absolute speed of the nacelle or a point on the tower due to motion in pitch).

An example of a control system with a vibration controller with active damping for a fixed-base wind turbine is shown in FIG. 3. The upper line in FIG. 3 is the active vibration controller part of the control system, which uses measurements of the tower velocity to prevent or minimise negative damping, as described above. The rest of the system is the standard controller which provides standard blade pitch control based on the rotor speed.

In FIG. 3, $v_{nacelle}$, is the speed of the nacelle, $h_c(s)$ is the transfer function between the rotor speed error signal $\omega_{ref}$ and the blade pitch reference signal $\beta_{ref}$, $h_p(s)$ is the transfer function between the blade pitch reference signal $\beta_{ref}$ and the wind turbine rotor speed $\omega_r$, and $K_d$ is the vibration controller gain.

In general, a transfer function gives the ratio between the Laplace transforms of the output and the input to a system component as a function of a variable s (where s is usually related to a spatial or temporal frequency, such as angular frequency).

The transfer function $h_c(s)$ can be provided by means of a PI controller in which case it can be expressed as follows:

$$h_c(s) = K_P + \frac{K_I}{s} \quad (19)$$

where $K_I$ and $K_P$ are the integral and proportional gains of the PI controller, respectively, as described above, and have the following forms:

$$K_I = -\left(\omega_0^2 I + \frac{P_0}{\Omega_0^2}\right)\frac{\Omega_0}{\frac{\partial P}{\partial \theta}\bigg|_{\theta_0}} \quad (20)$$

and $$K_P = -\frac{2I\omega_0\zeta\Omega_0}{\frac{\partial P}{\partial \theta}\bigg|_{\theta_0}} \quad (21)$$

where the term $$\frac{\partial P}{\partial \theta}\bigg|_{\theta_0}$$

is negative and it varies with the actual blade pitch $\theta_0$.

The values of the parameters of the controller are determined by conventional tuning of the control system to the desired bandwidth.

The signal processing block in FIG. 3 will typically consist of some suitable filtering for removal of certain frequency components.

For the rest of the system, the loop transfer function $h_0(s)$ is defined as:

$$h_0(s) = h_c(s)h_p(s) \quad (22)$$

and the expression for the rotational frequency of the rotor is given as:

$$\omega_r(s) = \frac{h_0(s)}{1+h_0(s)}\omega_{ref} + \frac{h_p(s)}{1+h_0(s)}K_d v_{nacelle} \quad (23)$$

A measure of the control system's ability to follow the reference signal is given as:

$$M(s) = \frac{h_0(s)}{1+h_0(s)} \quad (24)$$

and the error between the desired reference signal and the measurement is given as:

$$N(s) = \frac{1}{1+h_0(s)} \quad (25)$$

Considering equations (24) and (25) in the frequency domain (i.e. where $s=j\omega$) gives:

$|M(j\omega)| \approx 1$ and $\angle M(j\omega) \approx 0$ when $|h_0(j\omega)| \gg 1 \quad (26)$ $|M(j\omega)| \approx |h_0(j\omega)|$ and $\angle M(j\omega) \approx \angle h_0(j\omega)$ when $|h_0(j\omega)| \ll 1 \quad (27)$ $N(j\omega) \approx \frac{1}{h_0(j\omega)}$ and $\angle N(j\omega) \approx -\angle h_0(j\omega) \quad (28)$ when $|h_0(j\omega)| \gg 1$ $N(j\omega) \approx 1$ and $\angle N(j\omega) \approx 0$ when $|h_0(j\omega)| \ll 1 \quad (29)$ and inserting equations (24) and (25) into equation (23) gives:

$$\omega_r(s) = M(s)\omega_{ref} + N(s)h_p(s)K_d v_{nacelle} \quad (30)$$

In order that the controller can satisfactorily follow the blade pitch reference signal, the parameters of the controller transfer function $h_c(s)$ must be tuned such that $|h_0(j\omega)| \gg 1$ within the desired bandwidth of the control system. It therefore follows from equations (28) and (30) that N(s) will have a low absolute value within the bandwidth of the control system such that N(s) will suppress the response from $h_p(s) K_d v_{nacelle}$ with frequencies within the bandwidth of the system. In other words, for frequencies within the bandwidth of the standard controller part of the blade pitch control system, active damping is suppressed and for vibrations with frequencies above or near the bandwidth of the standard controller part N(s) will have an absolute value of around 1 and these vibrations will be actively damped.

As noted above, in fixed-base wind turbines, the control parameters of the blade pitch controller are tuned such that the bandwidth of the standard part of the controller lies below the natural frequency of the first bending mode of the tower, in order to prevent or minimise negative damping of the structural bending oscillations. In addition, a vibration control part such as the one shown in FIG. 3 may be provided to provide active positive damping for vibrations with frequencies of the first bending mode since these vibrations have a frequency that is not suppressed by this part of the controller.

Also as mentioned above, floating wind turbines can also have structural bending vibrations with natural frequencies around 0.3 to 1 Hz. However, they also have rigid body oscillations with frequencies around 0.03 to 0.04 Hz.

If the control system in FIG. 3 were used in a floating wind turbine and the blade pitch controller parameters were tuned according to the frequency of the first structural bending mode of the tower, the active damping contribution $N(s)h_p(s) K_d v_{nacelle}$ would provide positive damping of the high-frequency structural bending vibrations because the absolute value of N(s), according to equation (29), would be around 1 with very little phase lag for frequencies outside the bandwidth of the standard part of the control system. However, the contribution to the active damping of the low-frequency rigid body oscillations in pitch with frequencies around 0.03 to 0.04 Hz would be poor. These frequencies would be within the bandwidth of the standard controller part of the control system and the absolute value of N(s) would be low, according to equation (25), and therefore any active damping of these low frequency vibrations would be suppressed. Moreover, these frequencies would be within the bandwidth of the standard controller so the low-frequency rigid body oscillations of the support structure in pitch would suffer from negative damping.

At first sight it would appear possible to apply a similar approach to that used in fixed-base wind turbine installations in order to overcome negative damping of the rigid body oscillations in pitch in floating wind turbine installations.

Thus, the controller parameters would be tuned according to the rigid body oscillations so that negative damping of both the structural bending vibrations and the rigid body oscillations of the structure would be prevented or minimised (because these motions would lie outside of the bandwidth of the standard part of the controller). Furthermore, the vibration controller part of the controller in FIG. 3 would then provide additional positive damping for both the rigid body oscillations and the structural bending vibrations since the absolute value of N(s), according to equation (29), would be around 1 with very little phase lag for these frequencies.

However, if the controller of FIG. 3 were tuned in this way, it would lead to a very slow blade pitch controller that would not react to changes in wind speed with periods of less than 30 seconds (i.e. with frequencies of more than 0.03 Hz). This would result in unacceptable performance with respect to key wind turbine parameters such as variations in power production, shaft torque, rotor speed, rotor thrust force, etc. This would in particular be the case for a floating wind turbine installation as the floating support structure would also move in response to the wave forces. Therefore, in order to achieve acceptable wind turbine performance in a floating wind turbine, it is not enough to simply tune the standard part of the controller in FIG. 3 to act only on lower frequencies. Rather, a new controller is required that is able to both suppress negative damping and provide active damping of the rigid body oscillations without also compromising the wind turbine's performance.

The inventors of the present invention have already developed a blade pitch controller for a floating wind turbine structure formed of a support structure comprising a tower supporting a rotor having a plurality of blades, the controller comprising standard blade pitch control means and active damping means. This controller is described in WO 2007/053031.

SUMMARY OF THE INVENTION

The present invention relates to a blade pitch controller for a floating wind turbine structure comprising a support structure supporting a rotor having a plurality of blades, the controller comprising standard blade pitch control means; and active damping means; wherein the standard blade pitch control means is arranged to control a blade pitch using a transfer function between a rotor speed error and the blade pitch, and the active damping means is arranged to further control the blade pitch on the basis of a speed of a point on the wind turbine structure; wherein the active damping means is arranged to convert the speed of a point on the wind turbine structure into a rotor speed error and the same transfer function that is used in the standard blade pitch control means is used in the active damping means in order to convert the rotor speed error into a correction to the blade pitch.

In such a blade pitch controller, as the same transfer function between the rotor speed error and the blade pitch is used twice, both in the standard blade pitch control means and in the active damping means, the parameters of the controller can be tuned according to the first structural bending mode of the tower (i.e. the bandwidth of the controller need not be reduced) but the active damping contribution will not be suppressed for the low-frequency$_{[fG2]}$ rigid body oscillations. In this way, negative damping of the low frequency free, rigid body oscillations can be minimised or prevented, positive damping of these oscillations is also provided, and the wind turbine can still provide acceptable performance with respect to key wind turbine parameters such as variations in power production, shaft torque, rotor speed, rotor thrust force, etc.

The term "rotor speed error" means the difference between a desired and an actual rotor speed.

The term "standard control means" means the standard control means previously described, where the blade pitch is adjusted on the basis of the rotor speed.

The speed of a point on the wind turbine structure could be the pitch velocity or the horizontal speed of that point, for example, and the point could be located on the tower or a nacelle, for example. The speed of a point on the wind turbine structure may be measured directly, inferred, calculated or estimated by any suitable means. The invention does not require a specific point in particular to be used; it is just required to know the speed of a point somewhere on the wind turbine structure. Preferably, the point is located on a nacelle of the wind turbine structure.

The desired values of the controller parameters may depend on a number of factors, including the structural properties of a given wind turbine installation. In order to tune the controller parameters, an initial value of the controller parameters may be based on a theoretical or practical knowledge of the natural bending frequency of the support structure together with equations (16)-(18). Based on a continuously monitored wind turbine response, the controller gains in equations (20) and (21) may be changed by gradually modifying the natural frequency $\omega_0$ and the relative damping $\zeta$.

Preferably, the controller is arranged such that the controller parameters may be changed by remote operation. This ensures that the controller parameters are easy to change.

In a preferred embodiment of the invention, the active damping means comprises a low pass filter for filtering out changes in the speed of a point on the structure with frequencies above the natural frequency of the free, rigid body oscillations due to pitch. The low pass filter could filter out changes in the speed of a point on the structure with frequencies above around 0.04 or 0.05 Hz, for example. Preferably, this filter is a sharp filter such as a second or third order Butterworth low pass filter. Such filters ensure that only oscillations with the desired frequencies are actively damped and do not produce too much variation in rotor speed.

Preferably, the active damping means comprises active damping gain means which converts the speed of a point on the wind turbine structure into a desired rotor speed.

Preferably, the active damping gain means is arranged to reduce or prevent negative damping of rigid body oscillations of the wind turbine structure in pitch. Further preferably, the active damping gain means is arranged to provide net positive damping of rigid body oscillations of the wind turbine structure in pitch.

Preferably the transfer function that is used in both the active damping means and the standard blade pitch control means is implemented by means of a proportional integral (PI) controller. In one preferred embodiment, two PI controllers are provided, one in the active damping means and one in the standard blade pitch control means. Alternatively, a single PI controller is provided that is used by both the active damping means and the standard blade pitch control means. This alternative embodiment with just one PI controller that is used by both the active damping means and the standard blade pitch control means provides a controller with a slightly simpler structure.

The blade pitch of the rotor blades may be adjusted collectively (i.e. by the same amount) for all rotor blades. This provides a relatively simple way of adjusting the blade pitches.

Alternatively, the blade pitch may be adjusted separately for each rotor blade. In such a system, the blades may be adjusted separately to account for factors such as wind shear profile and the variation of wind velocity with height, for example.

In addition, the present invention relates to a method of controlling the blade pitch of a floating wind turbine structure comprising a support structure supporting a rotor having a plurality of blades, the method comprising: adjusting a blade pitch on the basis of the output of a transfer function between a rotor speed error and the blade pitch, and further adjusting the blade pitch on the basis of a speed of a point on the wind turbine structure, wherein the speed of a point on the wind turbine structure is converted into a rotor speed error which is then converted into a blade pitch using the same transfer function.

As will be apparent to a person skilled in the art, the transfer function or proportional integral controller will normally be provided in the form of software. Thus the controller comprises a processor for running this software. The processors could be microprocessors, for example.

The invention also relates to a wind turbine structure comprising: a support structure supporting a rotor having a plurality of blades; and a controller comprising: standard blade pitch control means; and active damping means; wherein the standard blade pitch control means is arranged to control a blade pitch using a transfer function between a rotor speed error and the blade pitch, and the active damping means is arranged to further control the blade pitch on the basis of a speed of a point on the wind turbine structure; wherein the active damping means is arranged to convert the speed of a point on the structure into a rotor speed error and the same transfer function that is used in the standard blade pitch control means is used in the active damping means in order to convert the rotor speed error into a correction to the blade pitch.

The present invention also relates to a software product comprising instructions which when executed by a processor cause the processor to control the blade pitch of a floating wind turbine structure comprising a support structure supporting a rotor having a plurality of blades by adjusting a blade pitch on the basis of the output of a transfer function between a rotor speed error and the blade pitch, and further adjusting the blade pitch on the basis of a speed of a point on the wind turbine structure, wherein the speed of a point on the wind turbine structure is converted into a rotor speed error, which is then converted into a blade pitch using the same transfer function.

Preferably the software product is a physical data carrier.

The present invention also relates to a method of manufacturing a software product which is in the form of a physical carrier, comprising storing on the data carrier instructions which when executed by a processor cause the processor to control the blade pitch of a floating wind turbine structure comprising a support structure supporting a rotor having a plurality of blades by adjusting a blade pitch on the basis of the output of a transfer function between a rotor speed error and the blade pitch, and further adjusting the blade pitch on the basis of a speed of a point on the wind turbine structure, wherein the speed of a point on the wind turbine structure is converted into a rotor speed error, which is then converted into a blade pitch using the same transfer function.

The invention has been described in terms of transfer functions. However, it will be appreciated that the invention extends to any means, function or process that may be employed to determine a correction to the blade pitch from a rotor speed error.

As mentioned above, the active damping means of the controller may comprise a low pass filter for filtering out changes in the speed of a point on the structure with frequencies above the natural frequency of the rigid body oscillations due to pitch wherein the filter is a second or third order Butterworth low pass filter.

Such filters ensure that only oscillations with the desired frequencies are actively damped and do not produce too much variation in rotor speed. It was not an obvious step for the inventors of the present invention to realise that second and third order Butterworth filters are particularly well-suited to this application and thus the present invention also relates to a blade pitch controller for a floating wind turbine structure comprising a support structure supporting a rotor having a plurality of blades, the controller comprising standard blade pitch control means; and active damping means; wherein the standard blade pitch control means is arranged to control a blade pitch using a transfer function between a rotor speed error and the blade pitch, and the active damping means is arranged to further control the blade pitch on the basis of a speed of a point on the wind turbine structure; wherein the active damping means comprises a low pass second or third order Butterworth filter for filtering out changes in the horizontal velocity of a point on the wind turbine structure with frequencies above the natural frequency of the free, rigid body oscillations due to pitch.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

Preferred embodiments of the invention will now be described by way of example only and with reference to the accompanying figures in which:

FIG. 10 is a table showing some key data for tower bending moments (17 m above sea level);

DETAILED DESCRIPTION

Figure 4:
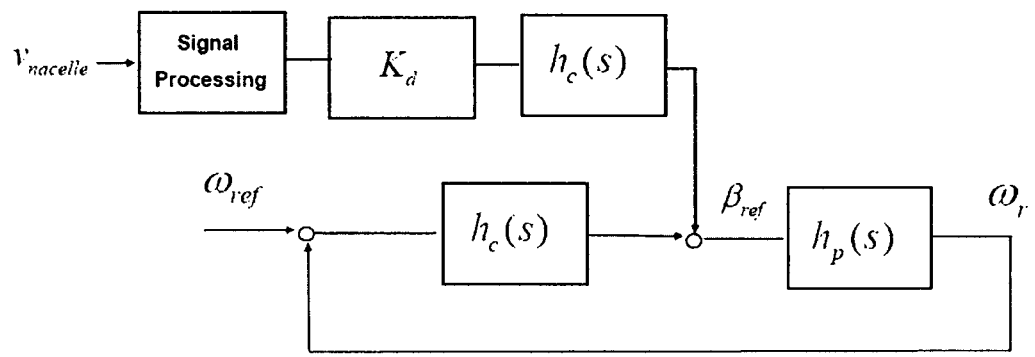
FIG. 4 is a schematic diagram of a blade pitch control system with active damping for a floating wind turbine.

FIG. 4 shows a schematic diagram of a blade pitch control system with active damping for a floating wind turbine installation.

Figure 3:
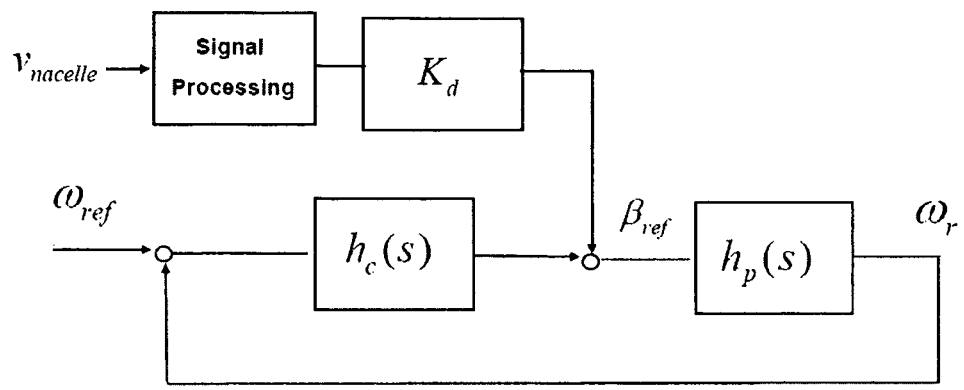
FIG. 3 is a schematic diagram of a blade pitch control system with vibration control for a fixed-base wind turbine.

Compared with FIG. 3, which shows a blade pitch control system involving vibration control for actively damping bending vibrations in a fixed-base wind turbine, the blade pitch control system for a floating wind turbine shown in FIG. 4 uses the transfer function $h_c(s)$ twice.

The angular frequency of the rotor $\omega_r$ in FIG. 4 can be expressed as:

$$\omega_r(s) = \frac{h_0(s)}{1+h_0(s)}\omega_{ref} + \frac{h_0(s)}{1+h_0(s)} K_d v_{nacelle} \quad (31)$$
$$= M(s)\omega_{ref} + M(s)K_d v_{nacelle}$$

Figure 1:
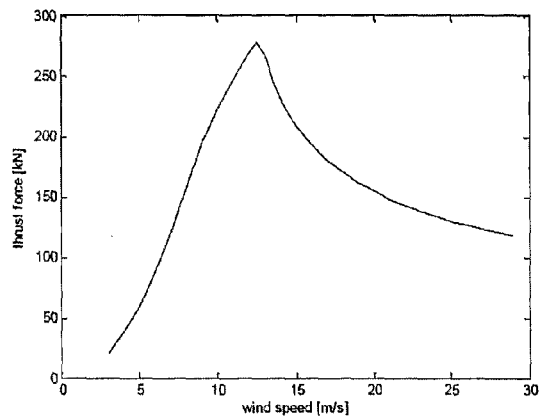
FIG. 1 is a graph of rotor thrust force as a function of wind speed for a 2.3 MW floating wind turbine using a conventional blade pitch control system.
Figure 2:
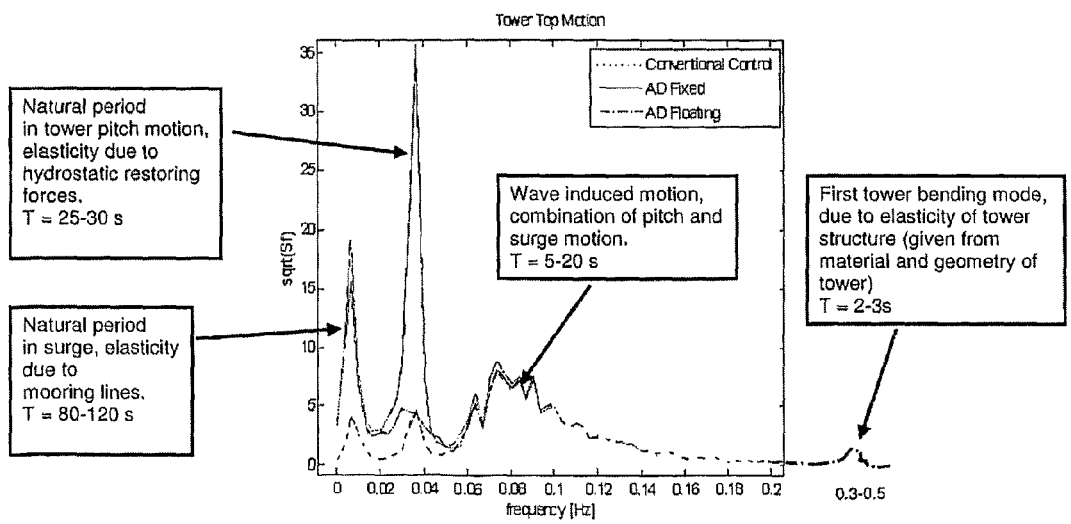
FIG. 2 is a typical power spectrum of oscillations in a floating wind turbine installation.

If the control parameters are tuned according to the first structural bending mode of the tower, the active damping contribution $M(s) K_d v_{nacelle}$ will be will provide active damping of the low frequency rigid body oscillations of the structure because, according to equation (26), the absolute value of $M(s)$ will have an absolute value of around 1 and very little phase lag for frequencies within the bandwidth of the standard part of the control system. However, the damping contribution of $M(s)K_d v_{nacelle}$ will be poor for structural bending mode vibrations since these vibrations have frequencies that are outside the bandwidth of the control system and, according to equation (27), $M(s)$ will suppress such contributions. Nevertheless, since the structural bending mode vibrations are usually considerably smaller than the rigid body oscillations, as shown in FIG. 2, it is not always necessary to provide positive damping of the structural bending mode vibrations. Alternatively, the controller shown in FIG. 4 could be modified to also include the active damping part of the controller shown in FIG. 3 (which does not use the transfer function $h_c(s)$), in order to provide active damping of the structural bending mode vibrations as well.

The main difference between the controller shown in FIG. 3 for fixed-base wind turbines and that shown in FIG. 4 for floating wind turbines is the inclusion of the controller transfer function $h_c(s)$ in the active damping means for the floating wind turbine.

Comparing FIG. 3 with FIG. 4, the signal processing blocks in these figures are also different due to the effect of the different controller structures and due to the different frequencies that are taken care of.

The signal processing block in the active damping controller for a floating turbine shown in FIG. 4 uses a sharp low pass filter with a filter frequency that is sufficiently below the wave frequency range (0.05 to 0.2 Hz) and sufficiently above the natural frequency of the tower in pitch (0.03 to 0.04 Hz) in order to avoid damping of wave induced motion, which would lead to bad performance with respect to key wind turbine parameters. In other words, the filter frequency is around 0.04 to 0.05 Hz.

In contrast, the signal processing block in the vibration controller for a fixed-base wind turbine, shown in FIG. 3, cannot have such a low pass filter because it would also filter out the part of the signal that is used by the vibration controller, i.e. the tower motion around the first tower bending mode which has a higher frequency than the waves. However, it is acceptable for the vibration controller in a fixed-base wind turbine not to have such a low pass filter because it does not have to account for wave induced motions.

The value of the active damping gain $K_d$ shown in FIGS. 3 and 4 will normally be different for the two cases (fixed-base and floating), and the exact value that is used for this parameter is found by conventional controller tuning.

Figure 5A:
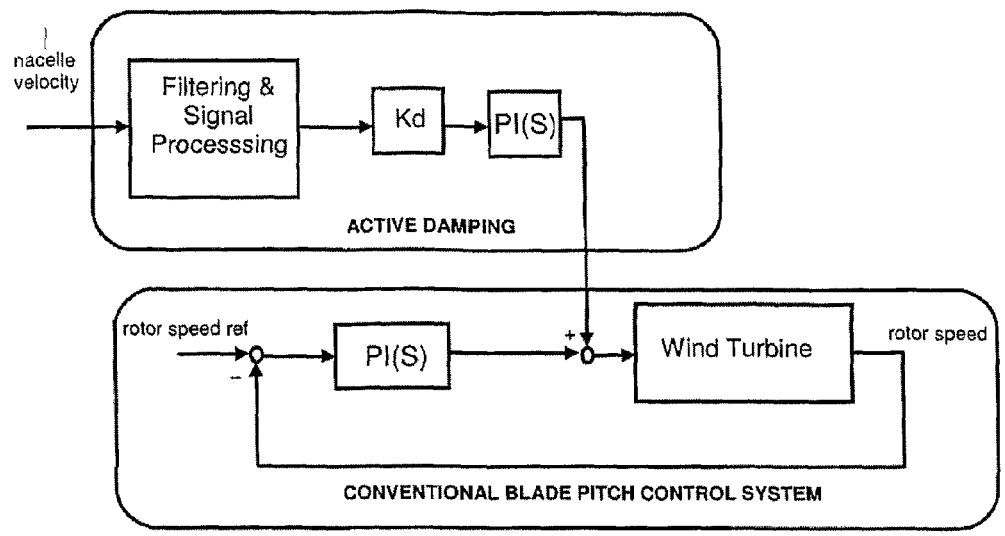
FIGS. 5($a$) and ($b$) are schematic diagrams of two alternative blade pitch control systems for a floating wind turbine.

An embodiment of a blade pitch controller of the present invention is shown in FIG. 5(a).

In FIG. 5(a), the upper box contains the active damping means, which takes a measurement of the nacelle's speed, such as its pitch velocity, as its input and comprises signal processing and low pass filter block, an active damping gain and a PI controller.

The low pass filter is a sharp filter which passes motions with a frequency corresponding to the natural frequency of the tower's free, rigid body oscillations in pitch (around 0.03 to 0.04 Hz) and stops motions with a frequency corresponding to the frequency of wave-induced motions (around 0.05 to 0.2 Hz). Second or third order Butterworth low pass filter are both suitable options for this.

The active damping gain converts the measurement of the nacelle's horizontal velocity into a rotor speed error.

The PI controller converts the rotor speed error into an adjustment to the blade pitch on the basis of the transfer function $h_c(s)$.

Figure 5B:
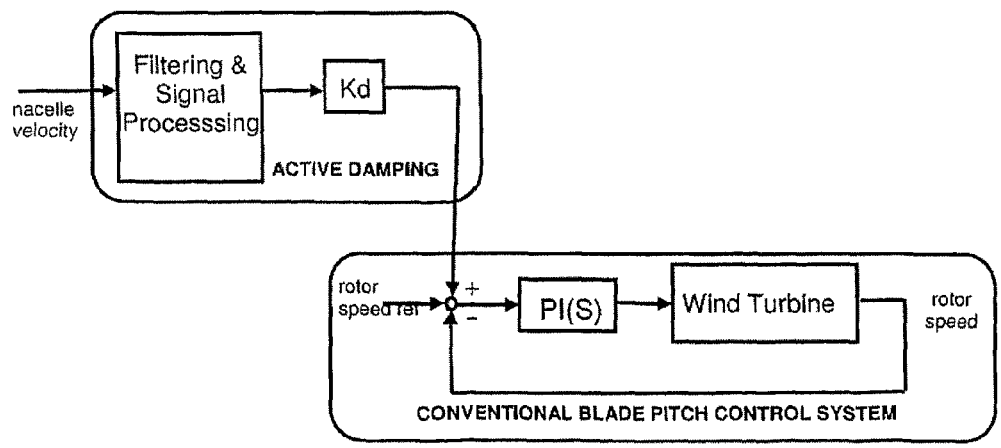

An alternative but equivalent embodiment of a blade pitch controller for a floating wind turbines is shown in FIG. 5(b). The only difference between the embodiments shown in FIGS. 5(a) and (b) is that in FIG. 5(b) only one PI controller is used but as its inputs come from both the standard part of the controller and the active damping part, the result is the same as if two PI controllers had been used as in the embodiment shown in FIG. 5(a).

FIGS. 6 to 16 show some simulation results that illustrate the effect of the following controllers when used on a floating wind turbine:

a standard blade pitch controller without active damping;

a controller with vibration control for active damping of structural bending mode vibrations for fixed-base wind turbines; and a controller with active damping control of rigid body oscillations for floating wind turbines.

These cases are also compared with the case where no wind is acting on the turbine and any motion is due to wave forces only. (waves only).

The simulations were performed with the following operating conditions: a wind speed of 17 ms$^{-1}$, a turbulence intensity of 10%, a significant wave height of 5 m and a characteristic peak period of the wave spectrum of 12 s. The turbulence intensity of the wind is defined as the ratio of the standard deviation to the mean value of the wind speed.

The active damping means for the floating wind turbine contained a third order Butterworth filter with a low pass filter frequency of 0.05 Hz, an active damping gain of $K_d$=0.2, and a PI controller containing the transfer function $h_c(s)$. The vibration control means for fixed-base wind turbines contained a Butterworth filter and an active damping gain of $K_d=0.5$. All three controllers used the same PI controller in the closed control loop, which is designed to provide constant power output. The values of $\omega_0$ and $\zeta$ were 0.6159 rad s$^{-1}$ and 0.7, respectively, which gave $K_p$, =2.8615 and $K_I$=1.7004 at zero blade pitch.

In a good controller, it is desirable to have small standard deviations in key wind turbine parameters such as rotor speed, power production and rotor thrust force, and the mean values of the rotor speed and the power production should coincide with their rated values. For the rotor speed it is also important that the maximum value is below a given limit which, if exceeded, would cause the turbine to be shut down. The maximum permitted rotor speed is around 2.1 rad s$^{-1}$ for the 2.3 MW turbine used in these simulations.

Figure 6:
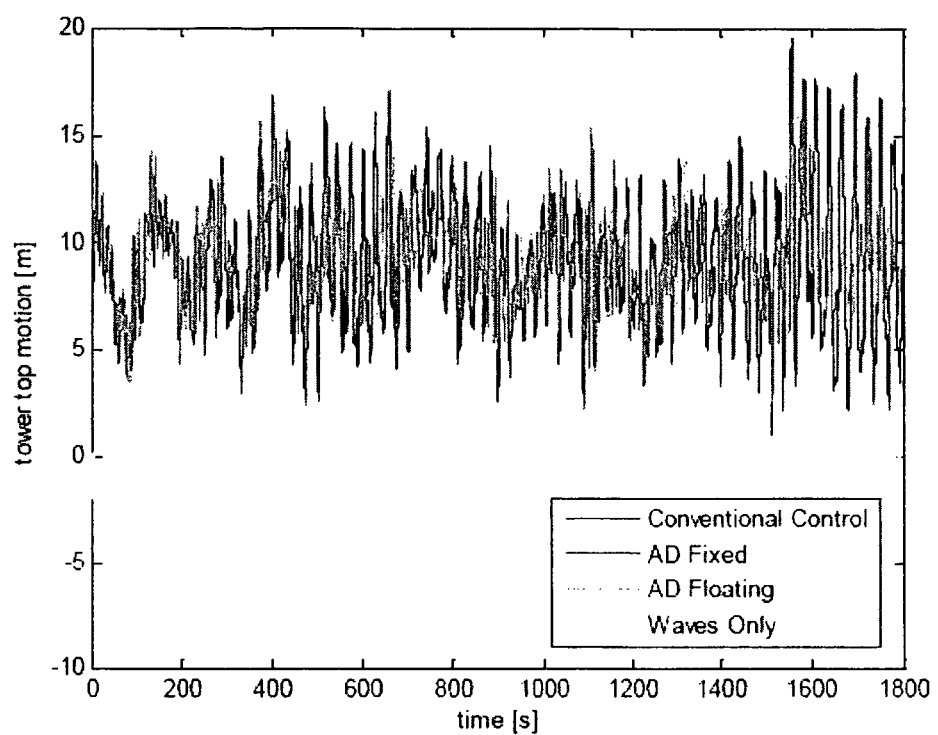
FIG. 6 shows a graph of a time domain simulation of tower top motion comparing a conventional controller, a controller for fixed-base turbines with vibration control, an active damping controller for floating turbines and waves only.
Figures 7, 8:
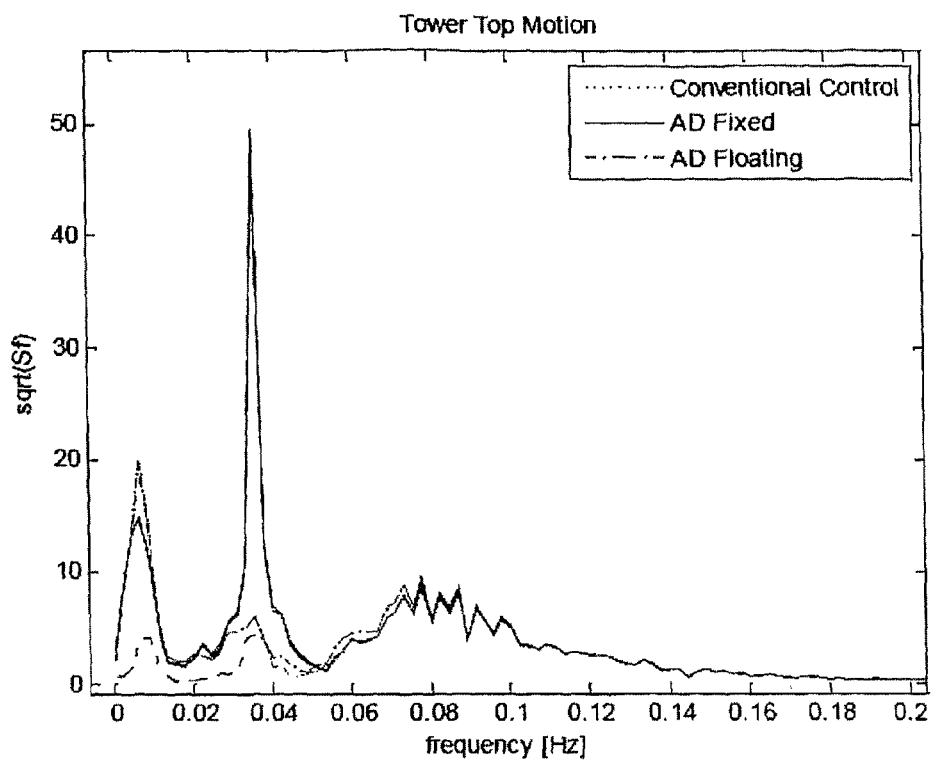
FIG. 7 shows a graph of a simulation of the frequency response for tower top motion comparing a conventional controller, a controller for fixed-base turbines with vibration control, an active damping controller for floating turbines and waves only.
FIG. 8 is a table showing some key data for nacelle motion.

FIG. 6 shows the size of the motion of the top of the wind turbine tower as a function of time for each of the cases listed above. As shown in FIG. 8, the mean value of the tower top motion is comparable for each of the three controllers. The mean value is mainly controlled by the mean wind thrust on the turbine. However, the standard deviation of this amplitude is considerably less when the controller for a floating wind turbine with active damping is used.

FIG. 7 shows a spectrum proportional to the square of the motion amplitude of the tower top motion plotted as a function of frequency. As expected, the size of the tower top motion with frequencies corresponding to those of the free, rigid body oscillations of the floating wind turbine in pitch (at frequencies of around 0.03 to 0.04 Hz) is considerably less when active damping is included in the controller than when a conventional controller, without active damping is used. It is also observed that, as desired, the motions in the range of the wave frequencies are not affected by the controller.

Figure 9:
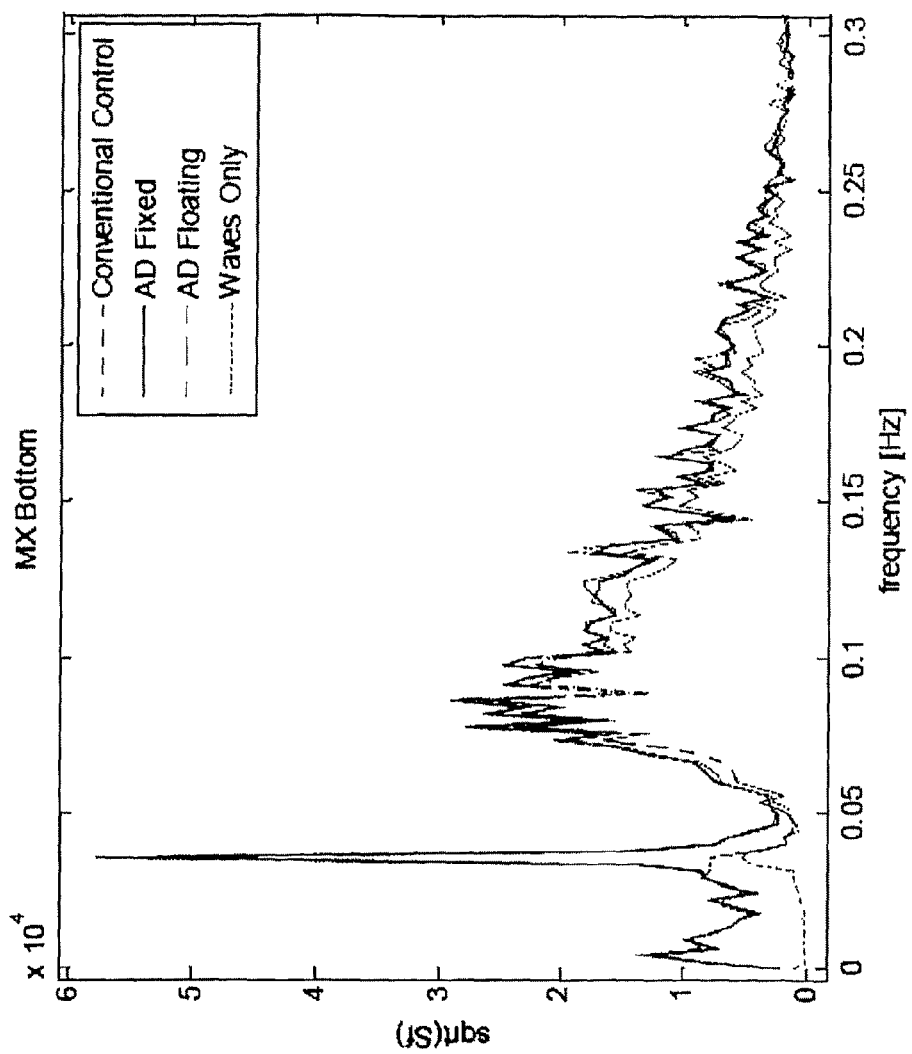
FIG. 9 shows a graph of a simulation of the frequency response for tower bending moment (17 m above sea level) comparing a conventional controller, a controller for fixed-base turbines with vibration control, an active damping controller for floating turbines and waves only.

FIG. 9 shows the tower bending moment 17 m above sea level as a function of frequency for each of the four cases listed above. The size of the bending moment on the tower for motions at frequencies corresponding to the rigid body oscillations of the floating wind turbine in pitch when a controller for a floating wind turbine is used is considerably less than when a conventional controller or one for a fixed-base wind turbine is used, where no active damping is provided for the rigid body oscillations of the floating wind turbine in pitch. The means and standard deviations are given in FIG. 10. The standard deviation is considerably less when the controller for a floating wind turbine is used than when a conventional controller or one for a fixed-base wind turbine with active damping is used.

Figures 11, 12:
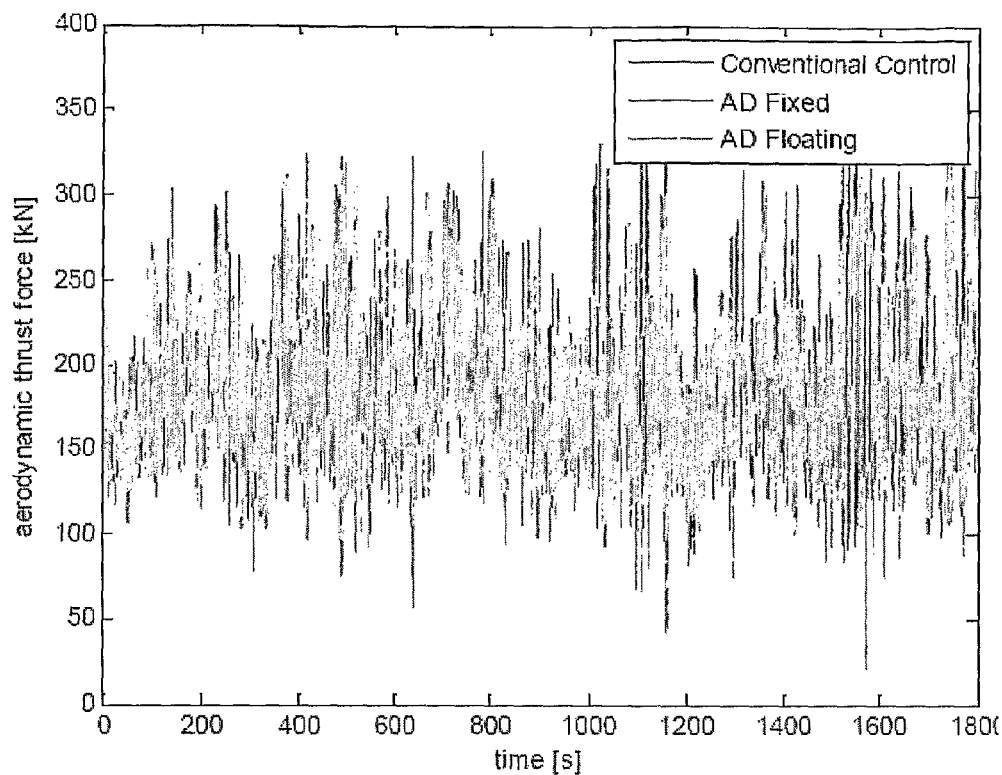
FIG. 11 a graph of a time domain simulation of rotor thrust force comparing a conventional controller, a controller for a fixed-base turbine with vibration control, an active damping controller for floating turbines and waves only.
FIG. 12 is a table showing some key data for rotor thrust force.

FIG. 11 shows the rotor thrust force as a function of time when each of the three controllers listed above is used. The means and standard deviations are given in FIG. 12. The standard deviation of the rotor thrust force is slightly larger when a controller for a floating wind turbine is used.

Figures 13, 14:
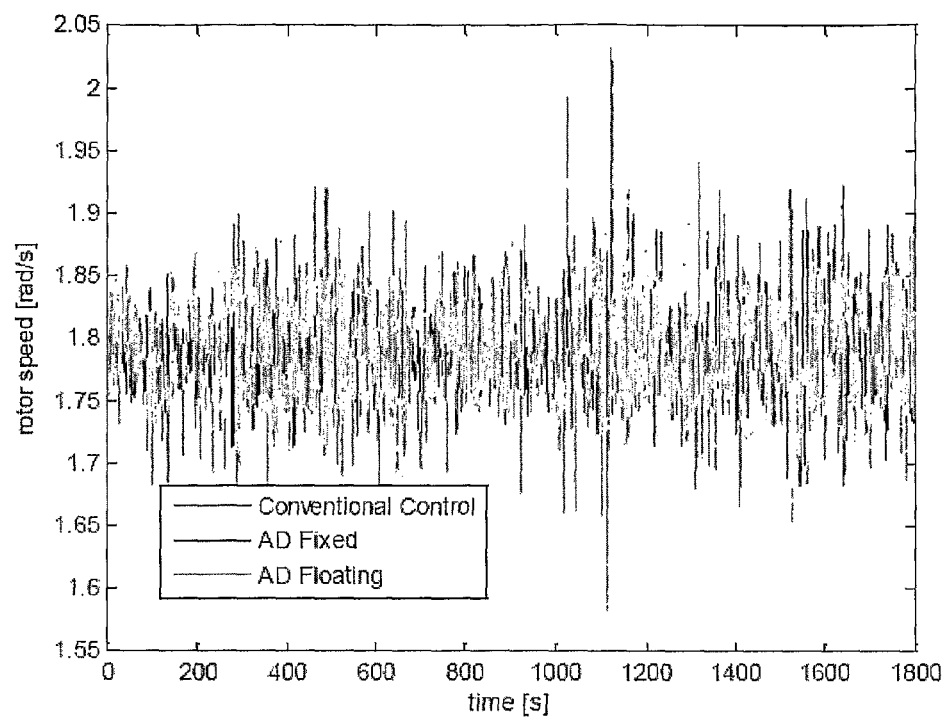
FIG. 13 is a graph of rotor speed versus time comparing a conventional controller, a controller for a fixed-base turbine with vibration control and a controller for a floating wind turbine.
FIG. 14 is a table showing some key data for rotor speed.

FIG. 13 shows the rotor speed as a function of time when each of the three controllers listed above is used. The means and standard deviations are given in FIG. 14. The standard deviation of the rotor speed is slightly larger when a controller for a floating wind turbine is used. Furthermore, it is noted that the maximum desirable rotor speed is not exceeded in any case.

Figures 15, 16:
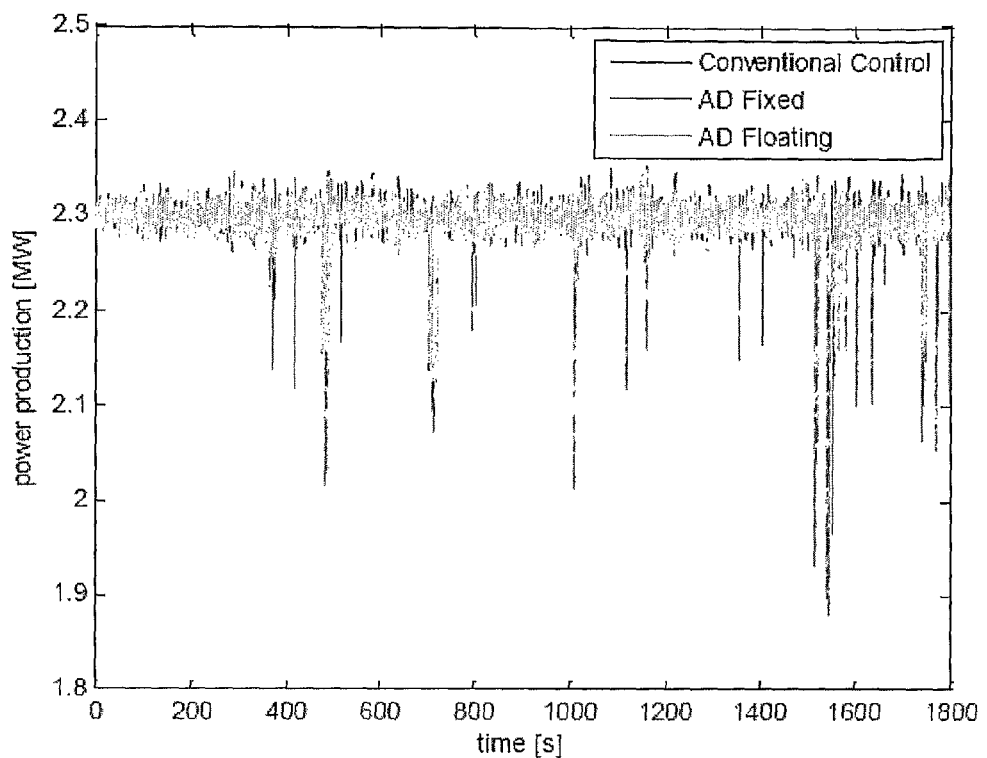
FIG. 15 is a graph of power productions versus time comparing a conventional controller, a controller for a fixed-base turbine with vibration control and a controller for a floating wind turbine.
FIG. 16 is a table showing some key data for power production.

FIG. 15 shows the power production as a function of time when each of the three controllers listed above is used. The means and standard deviations are given in FIG. 16. The standard deviation of the power production is slightly larger when a controller for a floating wind turbine is used.

Overall from the simulation results the following points can be noted:

the performance with respect to rotor speed, power production and rotor thrust force is slightly better when a conventional controller is used than when a vibration controller is used in a floating wind turbine;

the active damping controller for floating wind turbines (i.e. for rigid body motion control) gives considerably better performance with respect to tower motions and tower bending moments than the other controllers;

the motion characteristics of a floating wind turbine using an active damping controller for floating wind turbines is very similar to the case with waves only; and the performance of the vibration controller for fixed foundation wind turbines is very similar to that of the conventional controller, which coincides with the theoretical analysis given above.

It should be noted that although the present invention has been described using transfer functions, any other suitable mathematical representation of the systems involved could be used. Furthermore, although transfer functions are only generally valid for linear systems, the skilled person will understand that a non-linear system (such as those to which the present invention relates) can be represented by a transfer function with linear values around a particular operating point.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

We claim:

1. A blade pitch controller for a floating wind turbine structure comprising a support structure supporting a rotor having a plurality of blades, the controller comprising: standard blade pitch control means; and active damping means; wherein the standard blade pitch control means is arranged to control a blade pitch using a transfer function between a rotor speed error and the blade pitch; and the active damping means is arranged to further control the blade pitch on the basis of a speed of a point on the wind turbine structure by converting the speed of a point on the wind turbine structure into a rotor speed error and using the same transfer function that is used in the standard blade pitch control means to convert the rotor speed error into a correction to the blade pitch.

2. A blade pitch controller as claimed in claim 1, wherein controller parameters can be changed by remote operation.

3. A blade pitch controller as claimed in claim 1, wherein the active damping means comprises a low pass filter.

4. A blade pitch controller as claimed in claim 3, wherein the low pass filter is arranged to filter out changes in the speed of a point on the wind turbine structure with frequencies above the natural frequency of the rigid body oscillations of the wind turbine structure in pitch.

5. A blade pitch controller as claimed in claim 3, wherein the low pass filter is arranged to filter out changes in the speed of a point on the wind turbine structure with frequencies above 0.05 Hz.

6. A blade pitch controller as claimed in claim 3, wherein the low pass filter is arranged to filter out changes in the speed of a point on the wind turbine structure with frequencies above 0.04 Hz.

7. A blade pitch controller as claimed in claim 3, wherein the low pass filter is a sharp filter.

8. A blade pitch controller as claimed in claim 3, wherein the low pass filter is a second or third order Butterworth low pass filter.

9. A blade pitch controller as claimed in claim 1, wherein the active damping means comprises active damping gain means which converts the speed of a point on the wind turbine structure into a rotor speed error.

10. A blade pitch controller as claimed in claim 9, wherein the active damping gain means is arranged to reduce or prevent negative damping of rigid body oscillations of the wind turbine structure in pitch.

11. A blade pitch controller as claimed in claim 9, wherein the active damping gain means is arranged to provide net positive damping of rigid body oscillations of the wind turbine structure in pitch.

12. A blade pitch controller as claimed in claim 1, wherein the transfer function that is used in both the active damping means and the standard blade pitch control means is implemented in the form of a proportional integral controller.

13. A blade pitch controller as claimed in claim 11, wherein the controller comprises two proportional integral controllers, one in the active damping means and one in the standard blade pitch control means.

14. A blade pitch controller as claimed in claim 12, wherein the controller comprises a proportional integral controller that is arranged to be used by both the active damping means and the standard blade pitch control means.

15. A blade pitch controller as claimed in claim 1, wherein the blade pitch can be adjusted separately for each rotor blade.

16. A method of controlling the blade pitch of a floating wind turbine structure comprising a support structure supporting a rotor having a plurality of blades, the method comprising: adjusting a blade pitch on the basis of the output of a transfer function between a rotor speed error and the blade pitch; and further adjusting the blade pitch on the basis of a horizontal speed of a point on the wind turbine structure; wherein the speed of a point on the wind turbine structure is converted into a rotor speed error which is then converted into a blade pitch using the same transfer function.

17. A method as claimed in claim 16, wherein the blade pitch is only further adjusted for changes in the speed of a point on the wind turbine structure with frequencies above a certain value.

18. A method as claimed in claim 17, wherein the certain value is above the natural frequency of the rigid body oscillations of the structure in pitch.

19. A method as claimed in claim 17, wherein the certain value is 0.05 Hz.

20. A method as claimed in claim 17, wherein the certain value is 0.04 Hz.

21. A method as claimed in claim 17, wherein the changes in the speed of a point on the wind turbine structure are filtered using a low pass filter.

22. A method as claimed claim 21, wherein the low pass filter is a second or third order Butterworth low pass filter.

23. A method as claimed in claim 16, wherein the speed of a point on the structure is converted into a rotor speed error using an active damping gain means.

24. A method as claimed in claim 23, wherein the active damping gain means is arranged to reduce or prevent negative damping of rigid body oscillations of the wind turbine structure in pitch.

25. A method as claimed in claim 23, wherein the active damping gain means is arranged to net provide positive damping of rigid body oscillations of the wind turbine structure in pitch.

26. A method as claimed in claim 16, wherein the transfer function that is used in both the active damping means and the standard blade pitch control means is implemented in the form of a proportional integral controller.

27. A floating wind turbine installation comprising a blade pitch controller as claimed in claim 1 or controlled according to claim 16.

\* \* \* \* \*